United States Patent Office 3,703,426
Patented Nov. 21, 1972

3,703,426
METHOD OF MAKING POLYESTER LAMINATES
William M. Larson, Hudson, and William E. Jackson, Akron, Ohio, assignors to The Goodyear Tire & Rubber Company, Akron, Ohio
No Drawing. Continuation of abandoned application Ser. No. 662,320, Aug. 22, 1967. This application Nov. 18, 1970, Ser. No. 90,775
Int. Cl. B32b *27/40;* C09j *5/02*
U.S. Cl. 156—308                                6 Claims

ABSTRACT OF THE DISCLOSURE

This invention relates to a method of making improved polyester laminates by washing the surface of the polyester with solvent solution of an organic polyisocyanate and then adding an isocyanate type adhesive to the surface and bringing the polyester composition containing the adhesive into contact with the materials to be laminated, either another polyester or a metal, and allowing the adhesive to set and cure.

---

This application is a continuation of application Ser. No. 662,320, filed Aug. 22, 1967, now abandoned.

This invention relates to a method of obtaining improved adhesion between polyester compositions per se and polyester compositions with metals during lamination. More specifically this invention relates to a method of obtaining improved adhesion between polyester compositions containing glass fiber reinforcement.

The adhesion of polyester compositions to one another or to metals to form laminates has been practiced for a number of years. When the laminates have been formed by using a polyester type adhesive it has been customary to sandblast the surfaces to be adhered. Recently the use of polyurethane type adhesive have come into use as they permit the laminate to be prepared without the need to sandblast the surfaces to be adhered, but the use of the polyurethane type adhesive has resulted in poor adhesive bonds in certain instances.

Therefore, it is an object of this invention to provide a method for obtaining improved adhesion between polyester compositions per se or with metals. This object and other advantages may be obtained by the practice of this invention as will be evident from the following discussion.

This object and others may be accomplished in accordance with this invention by subjecting the surface of the polyester composition and the metal to a treatment with a suitable solvent containing a small amount of an organic polyisocyanate such as the di- or tri-isocyanates, allowing the solvent to evaporate and then applying a suitable polyurethane type adhesive for the polyester composition to the surface to be bonded or laminated and allowing the adhesive to set and cure.

More specifically, the polyester compositions are those utilized for constructing panels or built-up objects of substantial rigidity, for instance, the use of polyester compositions containing glass fiber reinforcements such as those used in making automobile bodies or parts, boats, and related objects are the ones to which this invention has its primary benefit. These polyester compositoins may be made by reacting suitable polycarboxylic acids or their anhydrides wtih suitable glycols such as ethylene or propylene. For these purposes the polycarboxylic acids of the aromatic type are particularly suitable as they tend to give a more rigid composition, although the aliphatic polycarboxylic acids and anhydrides of 2 to 20 carbon atoms are useful, too. Specific examples of these aromatic polycarboxylic acids are phthalic, isophthalic and terephthalic. Also unsaturated polycarboxylic acids such as maleic and fumaric are utilized where it is desired to introduce a small to a relatively large amount of unsaturation in the polyester composition, especially where the composition is to be cured or set by peroxide curing either alone or in conjunction with an unsaturated monomer or α-olefin such as styrene or acrylonitrile, etc.

The glass fiber reinforced polyester compositions are well known and are used widely but in general these compositions are prepared by forming a copolymer containing maleic anhydride or related unsaturated polycarboxylic acids and one of the phthalic acids with ethylene glycol.

The polyester compositions of this invention may be laminated or bonded to themselves or with various metals such as aluminum, steel, copper and magnesium.

The isocyanate type adhesive is normally prepared by reacting suitable reactive hydrogen containing material that is polyfunctional with an organic polyisocyanate preferably to form a prepolymer and then the prepolymer is cured with a crosslinking agent such as the organo polyamines or the organic polyols or mixtures of these and in some instances even an atmospheric water cure may be used. The nature of these adhesives are better understood when it is appreciated that tri- and higher functional crosslinking agents give faster curing and in some instances permit the laminates to be prepared without the necessity of subjecting the parts to be adhered to form the laminate to a pressure treatment or combination of pressure and heat treatment to obtain the desired rate of cure and bond level. In general, the adhesive is prepared from reacting about 1.2 to 7.5 and preferably about 4.5 to 6.0 mols of an organic polyisocyanate with each mol of reactive hydrogen containing material having the molecular weight of about 500 to about 4000 and a hydroxyl number of about 20 to 1000 or more, with the preferred range being 50 to 300. Then this reaction product is cured with a suitable amount of polyols such as ethylene glycol, propylene glycol, butane diol, diethylene and triethylene glycols, glycerine, trimethylol propane and trimethylol ethane, tetraols or others. Usually the amount of crosslinker used will be about 1.0 mol with preferred range being 0.5 to 1.0 mol based on the excess polyisocyanate relative to the reactive hydrogen containing compounds present in the mixtures. In some instances it may be desirable to avoid the prepolymer step and mix all the ingredients in the adhesive in accordance with the one-step method.

A typical adhesive used commerically is prepared by reacting 100 parts by weight of a polypropylene ether glycol of 2000 molecular weight, about 50 parts of an organic polyisocyanate and about 20 to 30 parts of N,N, N′,N′-tetrakis (2-hydroxylpropyl) ethylene diamine. Various thickening agents such as zinc stearate coated talc or clays in the amount of about 40 to 100 parts by weight may be added to the adhesive along with catalysts such as the organic tin compounds and/or the tertiary amine compounds.

Suitable solvents for washing the surface of the polyester composition and the metals are those such as methyl ethyl ketone, acetone, ethylene dichloride, methylene chloride, chloroform, toluene, benzene, xylene, the aliphatic hydrocarbons, and coal tar and petroleum naphthas as well as other chlorinated solvents and naphthas.

The nature of this invention may be more specifically exemplified by the following examples wherein all parts are by weight unless otherwise indicated and the adhesions are expressed as pounds per square inch.

EXAMPLE I

The adhesive was prepared by reacting the first four ingredients shown in Table 1 to form a prepolymer and then the N,N,N′,N′-tetrakis (2-hydroxylpropyl) ethylene diamine was mixed with the prepolymer just prior to the time the adhesive was used.

TABLE 1

| Materials: | Parts by weight |
|---|---|
| Polypropylene ether glycol, 2000 molecular weight | 100 |
| Polymethylene polyphenylene polyisocyanate | 28 |
| Tolylene diisocyanate | 32 |
| Zinc stearate coated talc | 60 |
| N,N,N',N'-tetrakis (2-hyroxylpropyl) ethylene diamine | 23 |
| Total | 243 |

EXAMPLE II

Tensile test specimens (1" x 3") were cut from a panel of glass fiber reinforced polyester (abbreviated at FRP) about 100 mil thick. The specimens to be used as controls were painted with ethylene dichloride with care being taken to avoid rubbing the painted surface and then allowed to stand at room temperature until the ethylene dichloride had evaporated. A second set of test specimens were also painted with ethylene dichloride containing 2% by weight of a polymethylene poly(phenylisocyanate) (abbreviated PMPPI) containing approximately 30 to 50% by weight of methylene di(phenyl isocyanate) and allowed to stand for equivalent time. Then the specimens were treated with fresh polyurethane adhesive made according to Example I and placed in contact to form a cross. Each set of test specimens, after being placed in the cross relationship, were allowed to stand at room temperature (ca.—75° F.) for 1 hour and then baked 1 hour at 250 F. to complete the cure. The results of the test are shown in Table 2 on 3 sets of cross tensile specimens to indicate the reliability or reproducibility of the test results.

TABLE 2

| Surface treatment | Type FRP | Adhesion | Comments |
|---|---|---|---|
| Control | I | 405 | Deep fiber tear in first panel, only 25% adhesive layer separation. |
|  |  | 184 | 100% adhesive separation at panel interface. |
|  |  | 216 | Surface separation at panel interface. |
| 2% PMPPI | I | 446 | Primarily delamination of FRP panel. |
|  |  | 446 | Do. |
|  |  | 451 | Do. |
| Control | II | 318 | Mixed delamination of FRP panel and adhesive separation at panel interface. |
|  |  | 280 | Do. |
|  |  | 239 | Do. |
| 2% PMPPI | II | 345 | Delamination of FRP panel. |
|  |  | 350 | Do. |
|  |  | 350 | Do. |

From the above adhesive data, it is apparent that the use of the PMPPI treatment materially improved the adhesive strength and also improved the reliability of the adhesive bond with the FRP panels of Type I or II. Type I designates a commercial grade of FRP panel that gives adhesive delamination strength of at least about 400 pounds per square inch and Type II is a commercial grade of FRP panel that gives delamination strength of less than 400 pounds per square inch.

EXAMPLE III

Further, FRP test specimens were prepared in accordance with the procedure of Example II using Type I commercial FRP panel and compared with similarly prepared specimens except 2% by weight solution of toluene diisocyanate (TDI) in ethylene dichloride was used to paint one set of test specimens. The results of these tests are shown in Table 3.

TABLE 3

| Surface paint treatment | Adhesion | Comments |
|---|---|---|
| Ethylene dichloride | 143 | Panel surface separation. |
|  | 175 | Do. |
|  | 345 | Delamination, 20% panel surface separation. |
| 2% TDI-ethylene dichloride | 368 | Fiber tear. |
|  | 373 | Do. |
|  | 359 | Do. |
| 2% PMPPI ethylene dichloride | 414 | Fiber tear. |
|  | 442 | Do. |
|  | 423 | Do. |

EXAMPLE IV

A series of FRP test cross specimens were prepared by painting on a pretreatment, then a polyurethane adhesive of the type shown in Example I was used to cement the test specimens in the cross relationship. The cemented specimens were allowed to cure overnight (20 hours at 75° F.) before being subjected to the adhesion test with the results shown in Table 4.

TABLE 4

| Pretreatment: | Adhesion |
|---|---|
| Ethylene dichloride | 124 |
|  | 152 |
|  | 92 |
| 2% TDI-ethylene dichloride | 382 |
|  | 304 |
|  | 400 |
| 100% TDI Excess wiped dry | 428 |
|  | 433 |
|  | 433 |

EXAMPLE V

Another set of FRP specimens were prepared by brushing on the indicated pretreatment, then cementing the specimens in the cross relationship with a polyurethane type adhesive like shown in Example I. The cemented samples were cured overnight at room temperature and then baked 1 hour at 250° F. The adhesion test results are shown in Table 5.

TABLE 5

| Pretreatment: | Adhesion |
|---|---|
| Ethylene dichloride | 129 |
|  | 193 |
|  | 156 |
| 5% CB-75*-ethylene dichloride | 460 |
|  | 432 |
|  | 322 |

*Toluene diisocyanate capped trimethylol propane.

Any of the organic polyiocyanates may be used to pretreat the polyester surface to enhance the adhesion. Representative classes of these are the aromatic, aliphatic, and cycloaliphatic diisocyanates and the triisocyanates such as those listed in U.S. Pats. 2,917,489 and 3,102,875.

Since the organic polyisocyanates of higher molecular weight and higher isocyanate content are more viscous, the use of a solvent as vehicle to dilute or lower the viscosity aids the control application during the pretreatment of the polyester or metal surface. Suitable vehicles for the organic polyisocyanates are the ketones such as methyl ethyl ketone, acetone, the hydrocarbon distillates, chlorinated solvents as hydrocarbons and other solvents boiling below about 300° F.

While certain representative embodiments and details have been shown for the purpose of illustrating the invention, it will be apparent to those skilled in this art that various changes and modifications may be made therein without departing from the spirit or scope of the invention.

What is claimed is:

1. In a method of bonding a surface of a polyester composition to another surface of metal or polyester comprising cleaning the surface with a solvent and applying to the surface a polyurethane adhesive having active isocyanate groups, bringing the surfaces to be bonded into bonding relationship and setting the adhesive to develop an adhesive bond between said surfaces, the improvement wherein the surface has applied thereto an organic polyisocyanate before the polyurethane adhesive is applied.

2. The method of claim 1 wherein the polyurethane adhesive is prepared immediately before applying by mixing a prepolymer formed by reacting 1.2 to 7.5 moles of an organic polyisocyanate with a mole of a reactive hydrogen containing material of about 500 to 4000 and having a hydroxyl number of about 50 to 300 with a crosslinker selected from the class consisting of organic polyamines and organic polyols.

3. The method of claim 1 wherein the organic polyisocyanate is applied in a solvent vehicle that boils below 350° F.

4. The method of claim 1 wherein the surface of the polyester composition is a polyester containing glass fiber reinforcements at the time the surface is cleaned.

5. The method of claim 1 wherein the polyester composition is a fiber glass impregnated with a composition of unsaturated polyester and an $\alpha$-olefin selected from the class consisting of styrene and acrylonitrile.

6. The method of claim 5 wherein the unsaturated polyester contains maleic or fumaric acid radicals.

References Cited
UNITED STATES PATENTS

| | | | |
|---|---|---|---|
| 3,196,035 | 7/1965 | Yanagihara et al. | 117—47 A |
| 3,549,740 | 12/1970 | Schwarz | 117—138.8 FX |

WILLIAM J. VAN BALEN, Primary Examiner

J. C. GIL, Assistant Examiner

U.S. Cl. X.R.

117—47 R, 47 A, 76 F, 138.8 F, 161 KP; 161—190; 156—315, 331, 309